(12) United States Patent
Wang et al.

(10) Patent No.: US 8,874,094 B2
(45) Date of Patent: Oct. 28, 2014

(54) METHOD AND DEVICE FOR TRANSFERRING RADIO ACCESS TECHNOLOGY/FREQUENCY OF SELECT PRIORITY

(75) Inventors: Hucheng Wang, Beijing (CN); Hui Xu, Beijing (CN); Ming Al, Beijing (CN); Juan Zhang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 118 days.

(21) Appl. No.: 13/574,233

(22) PCT Filed: Dec. 30, 2010

(86) PCT No.: PCT/CN2010/080481
§ 371 (c)(1),
(2), (4) Date: Jul. 19, 2012

(87) PCT Pub. No.: WO2011/088728
PCT Pub. Date: Jul. 28, 2011

(65) Prior Publication Data
US 2012/0295630 A1    Nov. 22, 2012

(30) Foreign Application Priority Data

Jan. 20, 2010 (CN) .......................... 2010 1 0034291

(51) Int. Cl.
*H04M 3/00* (2006.01)
*H04W 8/24* (2009.01)
*H04W 48/18* (2009.01)
*H04W 60/00* (2009.01)
*H04W 28/04* (2009.01)

(52) U.S. Cl.
CPC ................ *H04W 8/24* (2013.01); *H04W 48/18* (2013.01); *H04W 60/00* (2013.01); *H04W 28/04* (2013.01)
USPC ...................... 455/418; 455/435.3; 455/435.1; 370/329

(58) Field of Classification Search
CPC ..... H04W 8/245; H04W 60/00; H04W 48/18; H04W 28/04
USPC ...................... 455/418, 435.3, 435.1; 370/329
See application file for complete search history.

(56) References Cited

U.S. PATENT DOCUMENTS

2010/0029248 A1* 2/2010 Shi et al. ................... 455/411
2010/0165940 A1* 7/2010 Watfa et al. ............... 370/329
2011/0103350 A1* 5/2011 Lindoff ..................... 370/332

FOREIGN PATENT DOCUMENTS

CN    101521871 A    9/2009

OTHER PUBLICATIONS

3GPP TS 23.401. v9.3.0, Dec. 2009, pp. 23-24 section 4.3.6, pp. 70-71 section 5.3.3.1.

(Continued)

*Primary Examiner* — Danh Le
(74) *Attorney, Agent, or Firm* — Kilpatrick Townsend & Stockton LLP

(57) ABSTRACT

An informing method and equipment for index parameter of access type/frequency of selection priority are provided. Said method includes that a Mobility Management Entity (MME) receives the voice capabilities and settings reported by User Equipment (UE) (101); the MME generates a Radio access type/Frequency of Selection Priority (RFSP) index according to the subscribed RFSP index, the voice capabilities and settings reported by said UE, and the operator's configuration policies (102); when the MME determines that said generated RFSP index is different from the RFSP index in use, it replaces the RFSP index in use with said generated RFSP index (104); the MME informs the Radio Access Network (RAN) of said generated RFSP index (105). The present invention overcomes the problem that the transmission of the new RFSP index in use can not be finished under the condition that the UE is in an idle state, the UE has no uplink data, and the MME does not receive the notification of the downlink data.

8 Claims, 5 Drawing Sheets

(56) References Cited

OTHER PUBLICATIONS

"General Packet Radio Service (GPRS) enhancements for Evolved Universal Terrestrial Radio Access Network (E-UTRAN) access", 3GPP TS 23.401 V9.3.0, Jan. 1, 2010.
Telecom Italia et al: "Selective Idle Mode Camping for Optimizing User Experience with CS Fallback", 3GPP TSG SA WG2 Meeting 75, Kyoto, Japan, Aug. 31-Sep. 4, 2009, vol. S2-095445 Aug. 25, 2009, pp. 1-12, XP002633837, Retrieved from the Internet: URL:ftp://ftp.3gpp.org/TSG_SAIWG2_Arch/TSGS2_75_Kyoto/Docs/S2-095445.zip [retrieved on Apr. 21, 2011].
Telecom Italia et al: "Delivery of UE voice capabilities/settings in NAS signaling", 3GPP Draft; S2-095448-UE-Voice-Capabilities-23060-REL9, $3^{rd}$ Generation Partnership Project (3GPP), Mobile Competence Centre ; 650, Route Des Lucioles ; F-06921 Sophia-Antipolis Ceoex; France, No. Kyoto; Sep. 4, 2009, XP050396905, [retrieved on Aug. 25, 2009].
Office Action issued by European Patent Office on Jun. 17, 2013.
European Search Report issued on Apr. 23, 2013.

\* cited by examiner

US 8,874,094 B2

METHOD AND DEVICE FOR TRANSFERRING RADIO ACCESS TECHNOLOGY/FREQUENCY OF SELECT PRIORITY

The present application is a US National Stage of International Application No. PCT/CN2010/080481, filed on 30 Dec. 2010, designating the United States, and claiming the benefit of Chinese Patent Application no. 201010034291.8, filed with the Chinese Patent Office on Jan. 20, 2010 and entitled "METHOD AND DEVICE FOR TRANSFERRING INDEX PARAMETER OF RADIO ACCESS TECHNOLOGY/FREQUENCY OF SELECTION PRIORITY", the entire disclosure of which is hereby incorporated by reference.

FIELD OF THE INVENTION

The present invention relates to a radio communication technology and particularly to a method and device for transferring an RFSP index parameter.

BACKGROUND OF THE INVENTION

In an existing protocol, an RFSP (RAT/Frequency of Selection Priority, where RAT stands for Radio Access Technology) index parameter has been introduced to support radio resource management in an RAN (Radio Access Network), and an RFSP index can be divided into a subscribed RFSP index and an RFSP index in use. The subscribed RFSP index is retrieved from an HSS (Home Subscriber Server), and the RFSP index in use, i.e., an RFSP index which is being used, is generated by an MME (Mobility Management Entity) according to a configuration policy of a visited network. The MME will store both of the RFSP indexes, and in a non-roaming status where the RFSP index in use is the same as the subscribed RFSP index, the MME will provide the RAN with the RFSP index-in-use parameter, and the RAN can obtain a cell reselection priority of a UE (User Equipment) from this RFSP index parameter to thereby control an access of the UE in an idle mode and also possibly redirect the UE in an active mode onto another RAT.

In the existing protocol, the RFSP index is configured statically according to an policy of a local operator and subscription information of a user and will not be modified by the MME, and it can be transported from the MME to the RAN in an Initial Context Setup Request message and a UE Context Modification Request message. The UE Context Modification Request message is intended to modify an set-up UE context and unavailable when UE is in the idle mode, and at present, when UE is in the idle mode, there are the following conditions to trigger the MME to transmit the Initial Context Setup Request message:

1. There is uplink data at the UE, and then an active flag can be carried in a TAU Request (TAU stands for Tracking Area Update) message to notify the MME to initiate a user plane bearer setup procedure via S1 interface;

2. The MME is notified of downlink data coming; and

3. A Service Request procedure.

At present a Long Term Evolution (LTE) network primarily provides a PS (Packet Switched) domain service while its voice service is based upon an IMS (IP Multimedia System), but some UE may not support an IMS voice capability or they can not select an IMS voice service due to a configuration policy of an operator, and at this time the network has to provide the UE with voice service of a CS (Circuit Switch) domain, thus necessitating a CS Fallback (Circuit Switched Fallback (typically CSFB or CS Fallback for brevity)) enabling the UE to access a 2G/3G network. However the CSFB may result in a specific delay, so in order to optimize an experience of a user, an enhanced RFSP index function has been proposed in the document S2-096004 so that the MME can modify and then transport the RFSP index in use to the RAN which in turn instruct the voice service-centric UE to reselect a cell and to be attached to the 2G/3G network without performing any CSFB. As further described in 23.401 of the document, the MME can generate a new RFSP index in use according to the subscribed RFSP index, voice capability and setting information provided by the UE and the configuration policy of the local operator and transport the new RFSP index in use to the RAN in a message via the S1 interface. Reference can be made to 23.401-S2-096004-4.3.6: Radio Resource Management functions for details.

A drawback of the prior art lies in that it has been proposed in the prior art only that after the capability and setting of the UE has been changed, the MME can modify and notify the RFSP index to the RAN in the Initial Context Setup Request message via the S1 interface, and then the RAN can use the RFSP index to select an access of the UE.

However the new RFSP index in use can not be transported until the UE triggers the MME to transmit the Initial Context Setup Request message.

SUMMARY OF THE INVENTION

A technical problem to be addressed by the invention is to provide a method and device for transferring an access technology/frequency of selection priority index parameter.

An embodiment of the invention provides a method for transferring an RFSP index parameter, which includes the steps of:

an MME receiving a voice capability and setting reported from a UE;

the MME generating an RFSP index according to a subscribed RFSP index, the voice capability and setting reported from the UE and a configuration policy of an operator;

the MME determining whether the generated RFSP index differs from an RFSP index in use;

the MME replacing the RFSP index in use with the generated RFSP index upon determining that the generated RFSP index differs from the RFSP index in use; and the MME transferring the generated RFSP index to an RAN.

An embodiment of the invention provides a method for triggering a transfer of an RFSP index parameter, which includes the steps of:

a UE determining that it is required to update an RFSP index parameter; and the UE reporting a voice capability and setting and transmitting a TAU Request message carrying an active flag to an MME, wherein the active flag indicates whether the MME activates a user plane bearer setup procedure via S1 interface.

An embodiment of the invention provides a method for transferring an RFSP index parameter, which includes the steps of:

an MME receiving a voice capability and setting reported from a UE and a TAU Request message carrying an active flag;

the MME generating an RFSP index according to a subscribed RFSP index, the voice capability and setting reported from the UE and a configuration policy of an operator;

the MME determining from the active flag whether to activate a user plane bearer setup procedure via S1 interface; and the MME transferring the generated RFSP index to an RAN upon determining that the generated RFSP index differs from an RFSP index in use after activating the user plane bearer setup procedure via the S1 interface.

An embodiment of the invention provides an MME device including:

a receiving module configured to receive a voice capability and setting reported from a UE;

a generating module configured to generate an RFSP index according to a subscribed RFSP index, the voice capability and setting reported from the UE and a configuration policy of an operator;

a determining module configured to determine whether generated RFSP index differs from an RFSP index in use;

a replacing module configured to replace the RFSP index in use with the generated RFSP index when it is determined that the generated RFSP index differs from the RFSP index in use; and a transferring module configured to transfer the generated RFSP index to an RAN.

An embodiment of the invention provides a user equipment including:

a determining module configured to determine that it is required to update an RFSP index parameter; and a reporting module configured to report a voice capability and setting and transmit a TAU Request message carrying an active flag to an MME, wherein the active flag indicates to the MME whether to activate a user plane bearer setup procedure via S1 interface.

An embodiment of the invention further provides an MME device including:

a receiving module configured to receive a voice capability and setting reported from a UE and a TAU Request message carrying an active flag;

a generating module configured to generate an RFSP index according to a subscribed RFSP index, the voice capability and setting reported from the UE and a configuration policy of an operator;

a determining module configured to determine from the active flag whether to activate a user plane bearer setup procedure via S1 interface; and a transferring module configured to transfer the generated RFSP index to an RAN when the MME determines that the generated RFSP index differs from an RFSP index in use after activating the user plane bearer setup procedure via the S1 interface.

An advantageous effect of the invention is as follows:

The technical solution according to the embodiments of the invention improves the existing procedure in which an MME modifies an RFSP to thereby address the problem of failing to transport a new RFSP index in use.

DETAILED DESCRIPTION OF THE EMBODIMENTS

There will be proposed in embodiments of the invention a solution to trigger an MME to notify an RAN of a change to an RFSP index in an idle mode. Thus when a voice capability and setting of a UE are changed or a configuration policy of a local operator is changed, the MME is triggered to modify the RFSP index and to notify the RAN so that the RAN can decide an access mode of the UE in an idle mode and possibly instruct the UE to reselect a cell. The embodiments of the invention will be described below with reference to the drawings.

There are proposed in the embodiments of the invention two solutions of triggering the MME to transmit an Initial Context Setup Request message in an idle mode, in one of which an MME decides to trigger an RFSP index in use to be updated, and in the other of which a UE decides to trigger an RFSP index in use to be updated.

Figure 1:
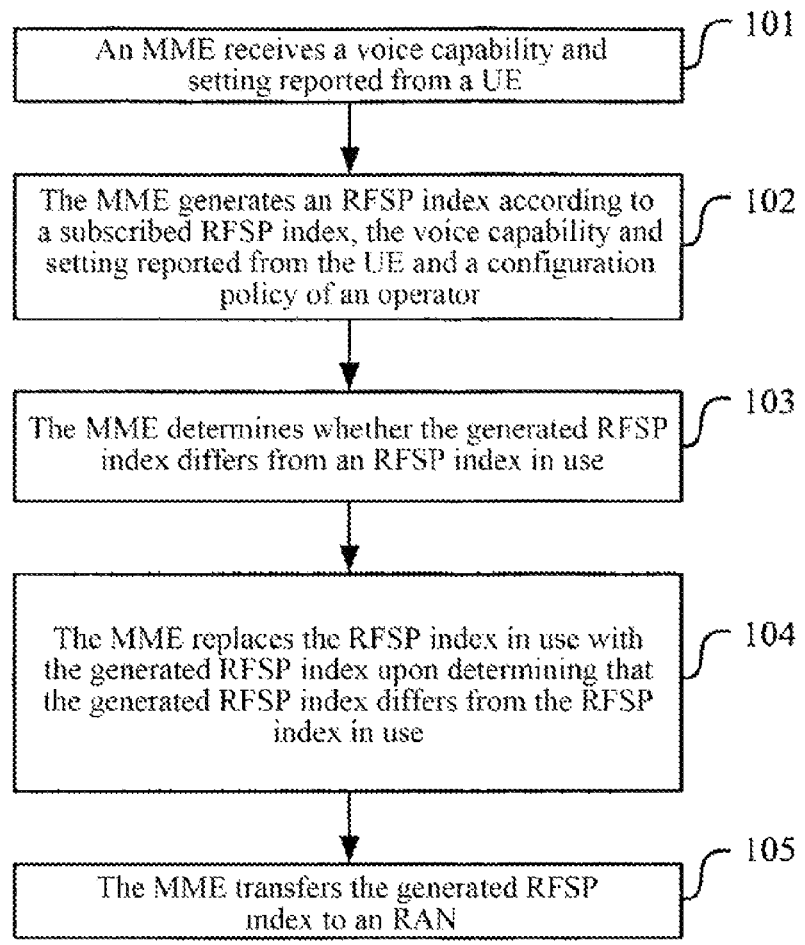
FIG. 1 is a schematic flow chart of implementing a first method for transferring an RFSP index parameter according to an embodiment of the invention.

In the first solution where an MME decides to trigger an RFSP index in use to be updated:

FIG. 1 is a schematic flow chart of implementing a first method for transferring an RFSP index parameter, and as illustrated in FIG. 1, an MME can transfer an RFSP index parameter to an RAN in the following steps:

Step 101: An MME receives a voice capability and setting reported from a UE;

Step 102: The MME generates an RFSP index according to a subscribed RFSP index, the voice capability and setting reported from the UE and a configuration policy of an operator;

Step 103: The MME determines whether the generated RFSP index differs from an RFSP index in use;

Step 104: The MME replaces the RFSP index in use with the generated RFSP index upon determining that the generated RFSP index differs from the RFSP index in use; and Step 105: The MME transfers the generated RFSP index to an RAN.

In an implementation, the voice capability and setting reported from the UE can be a voice capability and setting reported from the UE after the voice capability and setting of the UE are changed or the configuration policy of the local operator is changed.

The MME can transfers the generated RFSP index to the RAN in the step S105 as follows:

The MME triggers a user plane bearer setup procedure via S1 interface in a TAU procedure; and The MME carries the generated RFSP index parameter in an Initial Context Setup Request message and then transfers to the RAN.

In an implementation, the UE is in an idle mode and has no uplink data pending; and the MME receives no downlink data notification message for the UE.

Correspondingly there is further provided in an embodiment of the invention an implementation of transferring an RFSP index parameter at the UE side as described below.

Figure 2:
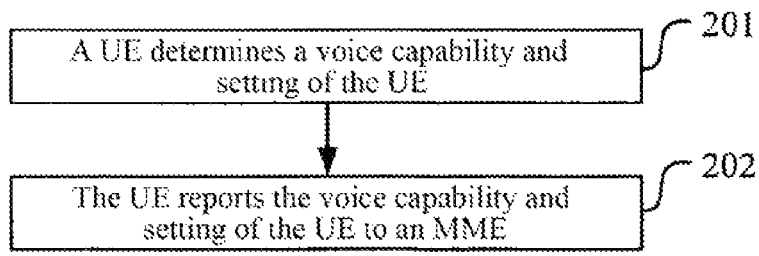
FIG. 2 is a schematic flow chart of implementing a method for reporting information according to an embodiment of the invention.

FIG. 2 is a schematic flow diagram of performing a method for reporting information, and as illustrated, reporting from a UE can include the following steps:

Step 201: A UE determines a voice capability and setting of the UE; and

Step 202: The UE reports the voice capability and setting of the UE to an MME.

In an implementation, the UE can report the voice capability and setting of the UE after the voice capability and setting are changed or a configuration policy of a local operator is changed.

Again in an implementation, the UE is in an idle mode and has no uplink data pending; and the MME receives no downlink data notification message for the UE.

In order to better understand an implementation of the first solution, it will be described below in an instance of an implementation thereof from both a UE and an MME.

Figure 3:
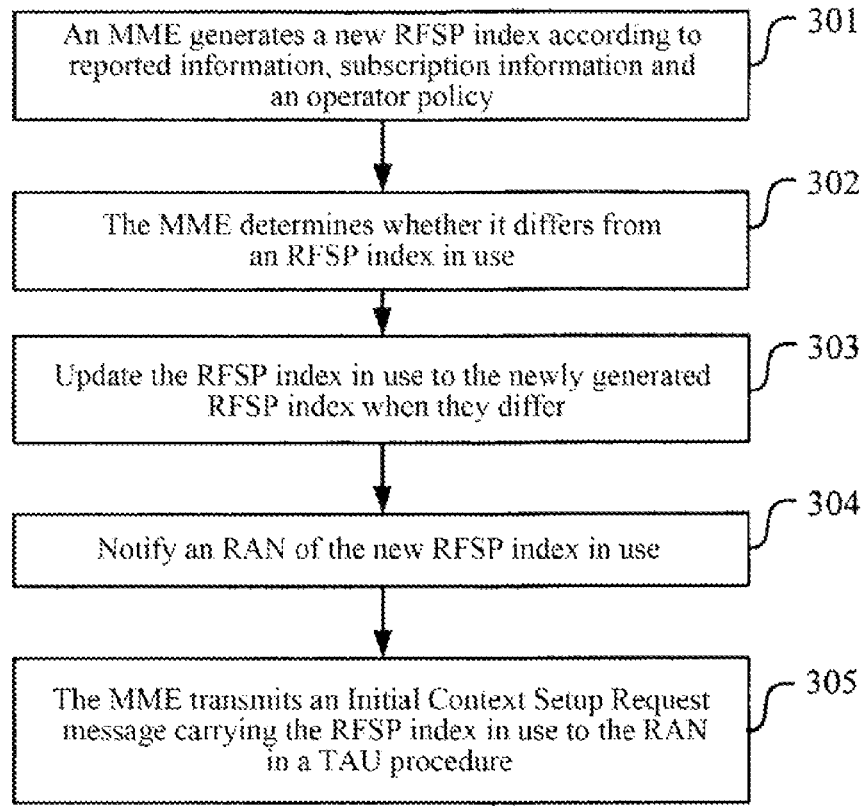
FIG. 3 is a schematic flow chart of an implementation in which an MME decides to trigger an RFSP index in use to be updated according to an embodiment of the invention.

FIG. 3 is a schematic flow chart of an implementation in which an MME decides to trigger an RFSP index in use to be updated, and as illustrated in FIG. 3, the following steps can be included:

Step 301: An MME generates a new RFSP index according to reported information, subscription information and a policy of an operator.

Step 302: The MME determines whether the newly generated RFSP differs from an RFSP index in use.

Step 303: The RFSP index in use is updated to the newly generated RFSP index when they are different.

Step 304: An RAN is notified of the new RFSP index in use.

Step 305: The MME transmits an Initial Context Setup Request message carrying the RFSP index in use to the RAN in a TAU procedure.

In an implementation, a UE can report a changed voice capability and setting thereof to the MME after the voice capability and setting thereof are changed or the configuration policy of a local operator is changed; the MME further generates the new RFSP index according to a subscribed RFSP index, voice capability and setting information provided by the UE and the configuration policy of the operator; the MME determines whether the new RFSP index differs from the RFSP index in use, and if so, then the MME replaces the original RFSP index in use; and if an RAN is to be notified, then the MME triggers a user plane bearer setup procedure via S1 interface in a TAU procedure, carries the new RFSP index in use in the Initial Context Setup Request message and then transports it to the RAN.

An advantage of the first solution lies in that since the MME decides whether to update the RFSP index in use and will initiate a procedure of transferring the RAN of the modified RFSP index in use only if it is required to be updated, therefore the number of times that the updated RFSP index in use is transferred to the RAN can be reduced to the largest extent. Furthermore some situations of an existing flow can be handled in which the MME can not transmit any Initial Context Setup Request message due to an abnormality, for example, a TAU procedure with an active flag can not setup normally a user plane bearer procedure, a service request procedure is rejected, etc.

In the second solution in which a UE decides to trigger an RFSP index in use to be updated:

Firstly an implementation at the UE side and then an implementation at an MME will be described below.

Figure 4:
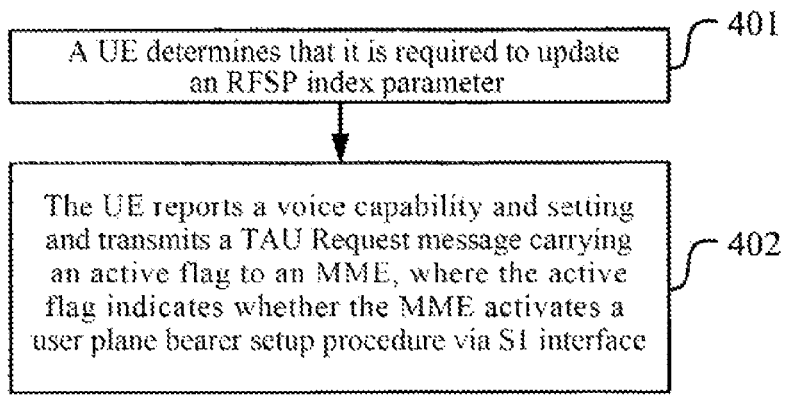
FIG. 4 is a schematic flow chart of implementing a method for triggering a transfer of an RFSP index parameter according to an embodiment of the invention.

FIG. 4 is a schematic flow chart of performing a method for triggering a transfer of an RFSP index parameter, and as illustrated in FIG. 4, the following steps can be included in triggering:

Step 401: A UE determines that it is required to update an RFSP index parameter; and Step 402: The UE reports a voice capability and setting and transmits a TAU Request message carrying an active flag to an MME, where the active flag indicates whether the MME activates a user plane bearer setup procedure via S1 interface.

In an implementation, the UE can determine that it is required to update the RFSP index parameter by determining whether it is required to update the RFSP index parameter according to a change to the capability of the UE and configuration information of a network upon change to the capability and setting of the UE.

In an implementation, the UE is in an idle mode and has no uplink data pending; and the MME receives no downlink data notification message for the UE.

Figure 5:
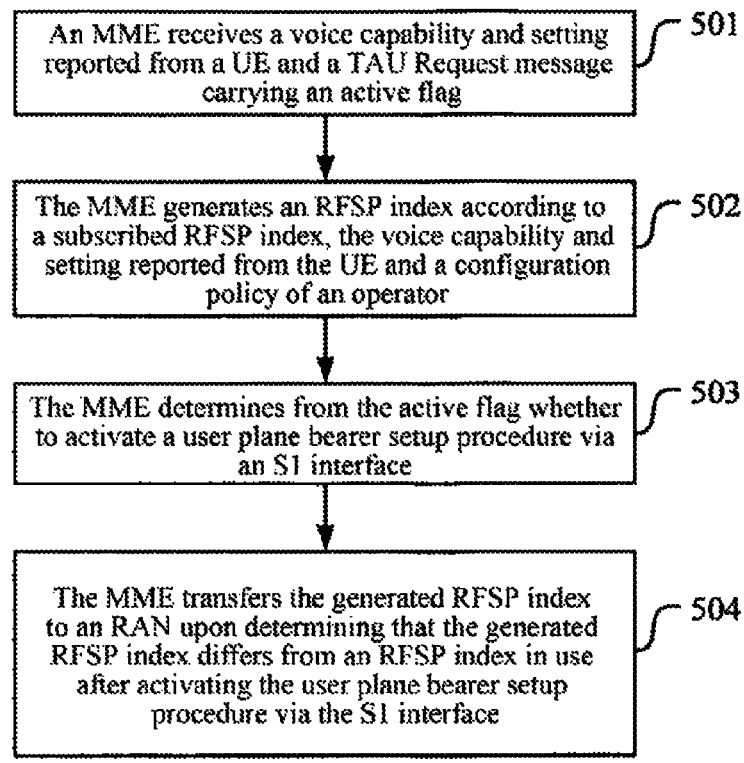
FIG. 5 is a schematic flow chart of implementing a second method for transferring an RFSP index parameter according to an embodiment of the invention.

FIG. 5 a schematic flow chart of implementing a second method for transferring an RFSP index parameter, and as illustrated in FIG. 5, an MME can transfer an RFSP index parameter to an RAN in the following steps:

Step 501: An MME receives a voice capability and setting reported from a UE and a TAU Request message carrying an active flag;

Step 502: The MME generates an RFSP index according to a subscribed RFSP index, the voice capability and setting reported from the UE and a configuration policy of an operator;

Step 503: The MME determines, from the active flag, whether to activate a user plane bearer setup procedure via S1 interface; and Step 504: The MME transfers the generated RFSP index to an RAN upon determining that the generated RFSP index differs from an RFSP index in use after activating the user plane bearer setup procedure via the S1 interface.

In an implementation, normally the MME will attempt to initiate the user plane bearer setup procedure via the S1 interface upon reception of the TAU Request carrying the active flag. However in an implementation the MME may possibly decide to reject the request of the UE due to an insufficient network resource or like.

In an implementation, the generated RFSP index is transferred to the RAN as follows:

The MME carries the generated RFSP index parameter in an Initial Context Setup Request message and then transfers to the RAN.

In an implementation, the UE is in an idle mode and has no uplink data pending; and the MME receives no downlink data notification message for the UE.

In order to better understand an implementation of the second solution, it will be described below in an instance of an implementation thereof from both a UE and an MME.

Figure 6:
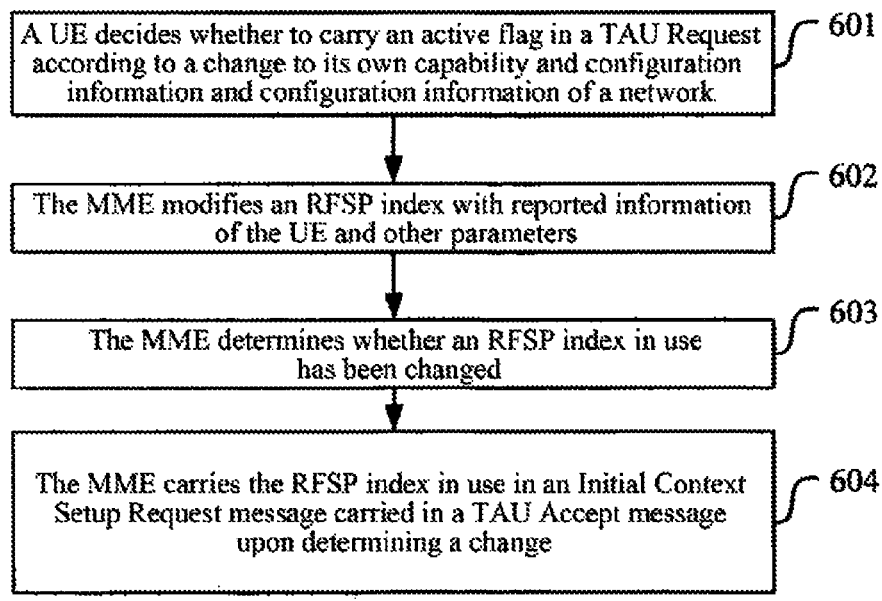
FIG. 6 is a schematic flow chart of an implementation in which a UE decides to trigger an RFSP index in use to be updated according to an embodiment of the invention.

FIG. 6 is a schematic flow chart of an implementation in which a UE decides to trigger an RFSP index in use to be updated, and as illustrated in FIG. 6, the following steps can be included:

Step 601: A UE decides whether to carry an active flag in a TAU Request according to a change to its own capability and configuration information and configuration information of a network.

Step 602: The MME modifies an RFSP index according to parameters, such as reported information of the UE, etc.

Step 603: The MME determines whether an RFSP index in use has been changed.

Step 604: The MME carries the RFSP index in use in an Initial Context Setup Request message carried in a TAU Accept message upon determining a change.

In an implementation, after the capability and setting of an UE are changed, the UE can decide whether to carry the active flag in the TAU Request message according to the change to its own capability (for example, being data service-centric changed to being voice service-centric) and the configuration information of the network, and the UE shall report its changed voice capability and setting information to the MME; the MME generates a new RFSP index in use according to a subscribed RFSP index, the voice capability and setting information provided by the UE and a configuration policy of a local operator upon reception of the information reported from the UE; and the MME decides from the active flag in the TAU Request message whether to activate a user plane bearer setup procedure via S1 interface; and the MME determines whether the newly generated RFSP index differs from the original RFSP index in use, and if so, then the MME carries the RFSP index parameter in the Initial Context Setup Request message and transports it to an RAN.

An advantage of the second solution lies in that in most case the UE knows the change to its own voice capability and setting, so the UE triggers the MME to transfer the change to the RFSP index to the RAN to thereby better reflect the change to the UE itself. Furthermore this method also reduces the number of determinations by the MME.

Based upon the same inventive idea, embodiments of the invention further provide MME devices and user equipments, and since these devices and equipments address the problem under a similar principle to the method for transferring an RFSP index parameter, the method for reporting information and the method for triggering a transfer of an RFSP index parameter, reference can be made to the implementations of the methods for details of implementations of these devices and equipments, and a repeated description thereof will be omitted here.

Like the idea of the first solution, embodiments of the invention provide the following MME device and UE as described below.

Figure 7:
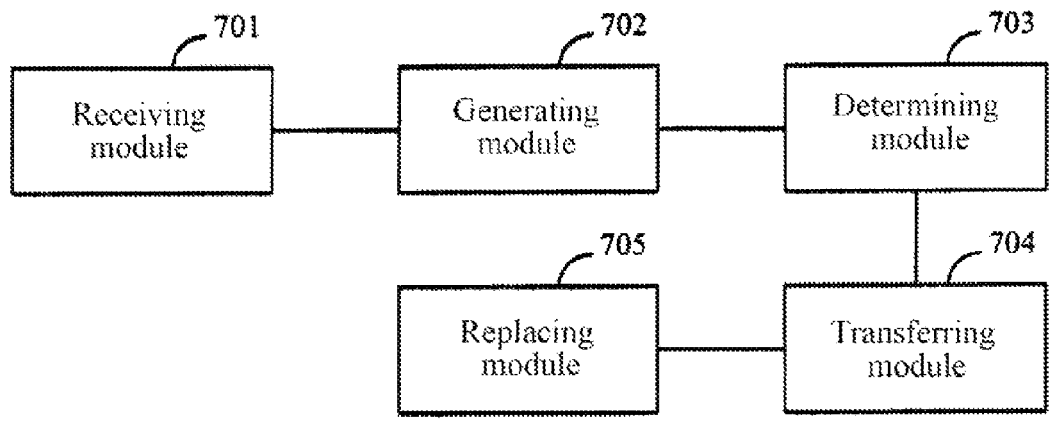
FIG. 7 is a schematic structural diagram of a first MME device according to an embodiment of the invention.

FIG. 7 is a schematic structural diagram of a first MME device, and as illustrated in FIG. 7, the MME can include:

A receiving module 701 configured to receive a voice capability and setting reported from a UE;

A generating module 702 configured to generate an RFSP index according to a subscribed RFSP index, the voice capability and setting reported from the UE and a configuration policy of an operator;

A determining module 703 configured to determine whether the generated RFSP index differs from an RFSP index in use;

A replacing module 704 configured to replace the RFSP index in use with the generated RFSP index when it is determined that the generated RFSP index differs from the RFSP index in use; and A transferring module 705 configured to transfer the generated RFSP index to an RAN.

In an implementation, the receiving module 701 can further be configured to receive the voice capability and setting reported from the UE after the voice capability and setting are changed or the configuration policy of the local operator is changed.

In an implementation, the notification module 705 can include:

A triggering unit configured to trigger a user plane bearer setup procedure via S1 interface in a TAU procedure; and A transferring unit configured to carry the generated RFSP index parameter in an Initial Context Setup Request message and then transfer to the RAN.

In an implementation, the receiving module 701 can further be configured to receive the voice capability and setting reported from the UE, which is in an idle mode and has no uplink data pending, when the MME receives no downlink data notification message for the UE.

Figure 8:
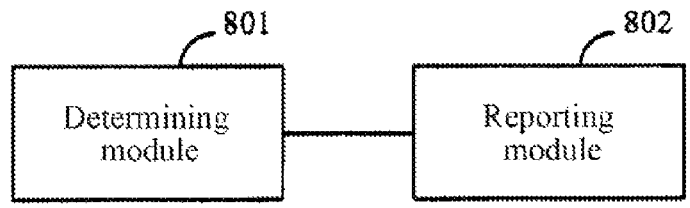
FIG. 8 is a schematic structural diagram of a first user equipment according to an embodiment of the invention.

FIG. 8 is a schematic structural diagram of a first user equipment, and as illustrated in FIG. 8, the UE can include:

A determining module 801 configured to determine a voice capability and setting of the UE; and A reporting module 802 configured to report the voice capability and setting of the UE to an MME.

In an implementation, the reporting module 802 can further be configured to report the voice capability and setting of the UE after the voice capability and setting are changed or a configuration policy of a local operator is changed.

In an implementation, the reporting module 802 can further be configured to report the voice capability and setting of the UE to the MME when the MME receives no downlink data notification message for the UE and the UE is in an idle mode and has no uplink data pending.

Like the idea of the second solution, embodiments of the invention provide the following MME device and UE as described below.

Figure 9:
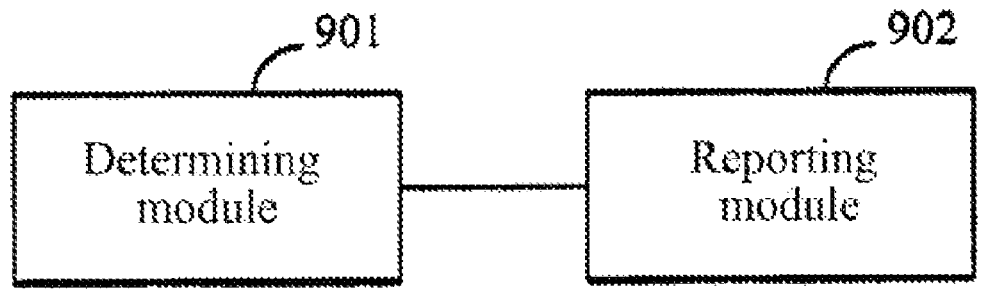
FIG. 9 is a schematic structural diagram of a second user equipment according to an embodiment of the invention.

FIG. 9 is a schematic structural diagram of a second user equipment, and as illustrated in FIG. 9, the UE can include:

A determining module 901 configured to determine that it is required to update an RFSP index parameter; and A reporting module 902 configured to report a voice capability and setting and transmit a TAU Request message carrying an active flag to an MME, where the active flag indicates whether the MME activates a user plan bearer setup procedure via S1 interface, In an implementation, the reporting module 902 can further be configured to determine whether it is required to update the RFSP index parameter according to a change to the capability of the UE and configuration information of a network after the capability and setting of the UE are changed.

In an implementation, the reporting module 902 can further be configured to report the voice capability and setting of the UE to the MME when the MME receives no downlink data notification message for the UE and the UE is in an idle mode and has no uplink data pending.

Figure 10:
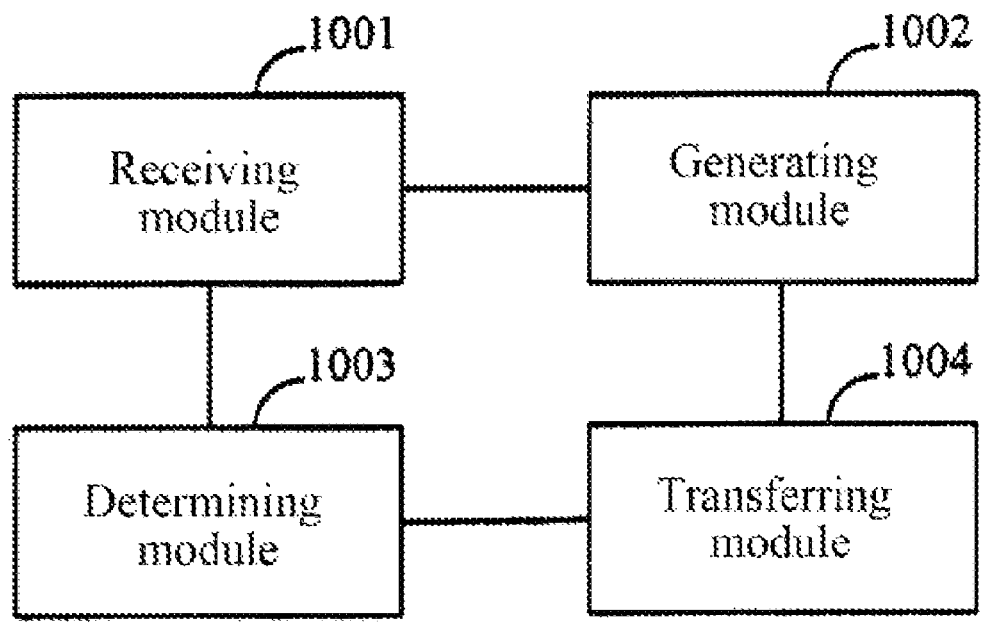
FIG. 10 is a schematic structural diagram of a second MME device according to an embodiment of the invention.

FIG. 10 is a schematic structural diagram of a second MME device, and as illustrated in FIG. 10, the MME can include:

A receiving module 1001 configured receive a voice capability and setting reported from a UE and a TAU Request message carrying an active flag;

A generating module 1002 configured to generate an RFSP index according to a subscribed RFSP index, the voice capability and reported from the UE and a configuration policy of an operator;

A determining module 1003 configured to determine from the active flag whether to activate a user plane bearer setup procedure via S1 interface; and A transferring module 1004 configured to transfer the generated RFSP index to an RAN when the MME determines that the generated RFSP index differs from an RFSP index in use after activating the user plane bearer setup procedure via the S1 interface.

In an implementation, the transferring module 1004 can further be configured to carry the generated RFSP index parameter an Initial Context Setup Request message and then notify the RAN.

In an implementation, the receiving module 1001 can further be configured to receive the voice capability and setting reported from the UE, which is in an idle mode and has no uplink data pending, when the MME receives no downlink data notification message for the UE.

For the convenience of a description, the respective components of the devices have been described respectively as various functional modules or units. Of course the functions of the respective modules or units can be performed in the same one or more items of software or hardware to put the invention to practice.

As can be apparent from the foregoing embodiments, the invention improves the existing procedure in which an MME modifies an RFSP to thereby address the problem of failing to transport a new RFSP index in use on the condition that a UE is in an idle mode and has no uplink data pending and that the MME receives no downlink data notification message for the UE.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded process or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transferring a Radio Access Technology/Frequency of Selection Priority, RFSP, index parameter, comprising the steps of:

a Mobility Management entity, MME, receiving a voice capability and setting reported from a User Equipment, UE;

the MME generating an RFSP index according to a subscribed RFSP index, the voice capability and setting reported from the UE and a configuration policy of an operator;

the MME determining whether the generated RFSP index differs from an RFSP index in use;

the MME replacing the RFSP index in use with the generated RFSP index upon determining that the generated RFSP index differs from the RFSP index in use; and the MME transferring the generated RFSP index to a Radio Access Network, RAN, wherein the UE is in an idle mode and has no uplink data pending; and the MME receives no downlink notification message data for the UE.

2. The method according to claim 1, wherein the voice capability and setting reported from the UE is a voice capability and setting reported from the UE after the voice capability and setting are changed or the configuration policy of the local operator is changed.

3. The method according to claim 1, wherein the MME transferring the generated RFSP index to the RAN comprises:

the MME triggering a user plane bearer setup procedure via S1 interface in a Tracking Area Update, TAU, procedure; and the MME carrying the generated RFSP index parameter in an Initial Context Setup Request message and then transferring to the RAN.

4. A method for triggering a transfer of an RFSP index parameter, comprising the steps of:

a UE determining that it is required to update an RFSP index parameter; and the UE reporting a voice capability and setting and transmitting a TAU Request message carrying an active flag to an MME, wherein the active flag indicates whether the MME activates a user plane bearer setup procedure via S1 interface, wherein the UE is in an idle mode and has no uplink data pending; and the MME receives no downlink notification message data for the UE.

5. The method according to claim 4, wherein the UE determines that it is required to update the RFSP index parameter according to a change to the capability of the UE and configuration information of a network after the capability and setting of the UE are changed.

6. An MME device, comprising:
- a receiving module configured to receive a voice capability and setting reported from a UE;
- a generating module configured to generate an RFSP index according to a subscribed RFSP index, the voice capability and setting reported from the UE and a configuration policy of an operator;
- a determining module configured to determine whether the generated RFSP index differs from an RFSP index in use;
- a replacing module configured to replace the RFSP index in use with the generated RFSP index when it is determined that the generated RFSP index differs from the RFSP index in use; and
- a transferring module configured to transfer the generated RFSP index to an RAN,
- wherein the receiving module is further configured to receive the voice capability and setting reported from the UE which is in an idle mode and has no uplink data pending when the MME receives no downlink notification message data for the UE.

7. The device according to claim 6, wherein the receiving module is further configured to receive the voice capability and setting reported from the UE when the voice capability and setting are changed or the configuration policy of the local operator is changed.

8. The device according to claim 6, wherein the notification module comprises:
- a triggering unit configured to trigger a user plane bearer setup procedure via S1 interface in a TAU procedure; and
- a transferring unit configured to carry the generated RFSP index parameter in an Initial Context Setup Request message and then transfer to the RAN.

* * * * *